(12) United States Patent
Yang et al.

(10) Patent No.: US 11,803,085 B2
(45) Date of Patent: Oct. 31, 2023

(54) ELECTRONIC DEVICE

(71) Applicant: Innolux Corporation, Miao-Li County (TW)

(72) Inventors: Shu-Han Yang, Miao-Li County (TW); Hui-Min Huang, Miao-Li County (TW); Chia-Min Yeh, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/727,840

(22) Filed: Apr. 25, 2022

(65) Prior Publication Data
US 2022/0252922 A1   Aug. 11, 2022

Related U.S. Application Data

(63) Continuation of application No. 17/033,693, filed on Sep. 26, 2020, now Pat. No. 11,347,113.

(30) Foreign Application Priority Data

Oct. 23, 2019 (CN) .......................... 201911013323.3

(51) Int. Cl.
G02F 1/1339 (2006.01)
G02F 1/1333 (2006.01)
G02F 1/1341 (2006.01)

(52) U.S. Cl.
CPC ........ *G02F 1/13394* (2013.01); *G02F 1/1341* (2013.01); *G02F 1/133345* (2013.01)

(58) Field of Classification Search
None
See application file for complete search history.

(56) References Cited

U.S. PATENT DOCUMENTS

| | | | |
|---|---|---|---|
| 6,639,244 B1 | 10/2003 | Yamazaki et al. | |
| 11,036,102 B1* | 6/2021 | Xiong | G02F 1/13338 |
| 11,437,414 B2* | 9/2022 | Du | H01L 27/1255 |
| 2016/0282677 A1* | 9/2016 | Yasuhiro | G02F 1/1339 |
| 2019/0041687 A1* | 2/2019 | Cheng | G02F 1/136204 |

OTHER PUBLICATIONS

"Office Action of Europe Counterpart Application", dated Feb. 20, 2023, p. 1-p. 5.

* cited by examiner

*Primary Examiner* — Richard H Kim
(74) *Attorney, Agent, or Firm* — JCIPRNET

(57) ABSTRACT

The electronic device includes a first substrate, a second substrate, a first support member, a planarization layer, and an alignment layer. The second substrate is opposite to the first substrate. The first support member is disposed in the peripheral region and located between the first substrate and the second substrate. The planarization layer is disposed on the first substrate and has a first portion and an opening. The first portion is disposed between the opening, and the first support member and the first portion are overlapped in a normal direction of the first substrate. The alignment layer is disposed on the planarization layer. The alignment layer on the first portion has a first thickness. The alignment layer in the opening has a second thickness. The first thickness is greater than or equal to zero and less than the second thickness.

8 Claims, 4 Drawing Sheets

ELECTRONIC DEVICE

CROSS-REFERENCE TO RELATED APPLICATION

This is a continuation application of and claims the priority benefit of a prior application Ser. No. 17/033,693, filed Sep. 26, 2020, now allowed, which claims the priority benefit of China application serial no. 201911013323.3, filed on Oct. 23, 2019. The entirety of each of the above-mentioned patent applications is hereby incorporated by reference herein and made a part of this specification.

BACKGROUND

Technical Field

The disclosure relates to an electronic device, and particularly relates to an electronic device with openings disposed in a peripheral region.

Description of Related Art

Electronic products have become indispensable necessities in modern society. Along with rapid development of the electronic products, consumers have high expectations for qualities, functions or prices of the products.

Therefore, the electronic products need to be improved, such as improving reliability of electronic devices, but there are still some problems to be solved.

SUMMARY

The disclosure is directed to an electronic device having better reliability or display quality.

According to an embodiment of the disclosure, the electronic device has a peripheral region, and includes a first substrate, a second substrate, a first support member, a planarization layer, and an alignment layer. The second substrate is opposite to the first substrate. The first support member is disposed in the peripheral region and located between the first substrate and the second substrate. The planarization layer is disposed on the first substrate and has a first portion and an opening. The first portion is disposed between the opening, and the first support member and the first portion are overlapped in a normal direction of the first substrate. The alignment layer is disposed on the planarization layer. The alignment layer on the first portion has a first thickness. The alignment layer in the opening has a second thickness. The first thickness is greater than or equal to zero and less than the second thickness.

Based on the above description, based on the planarization layer having the openings and configuration of the first portions between the openings, structural reliability, reliability, performance or display quality of the electronic device may be improved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
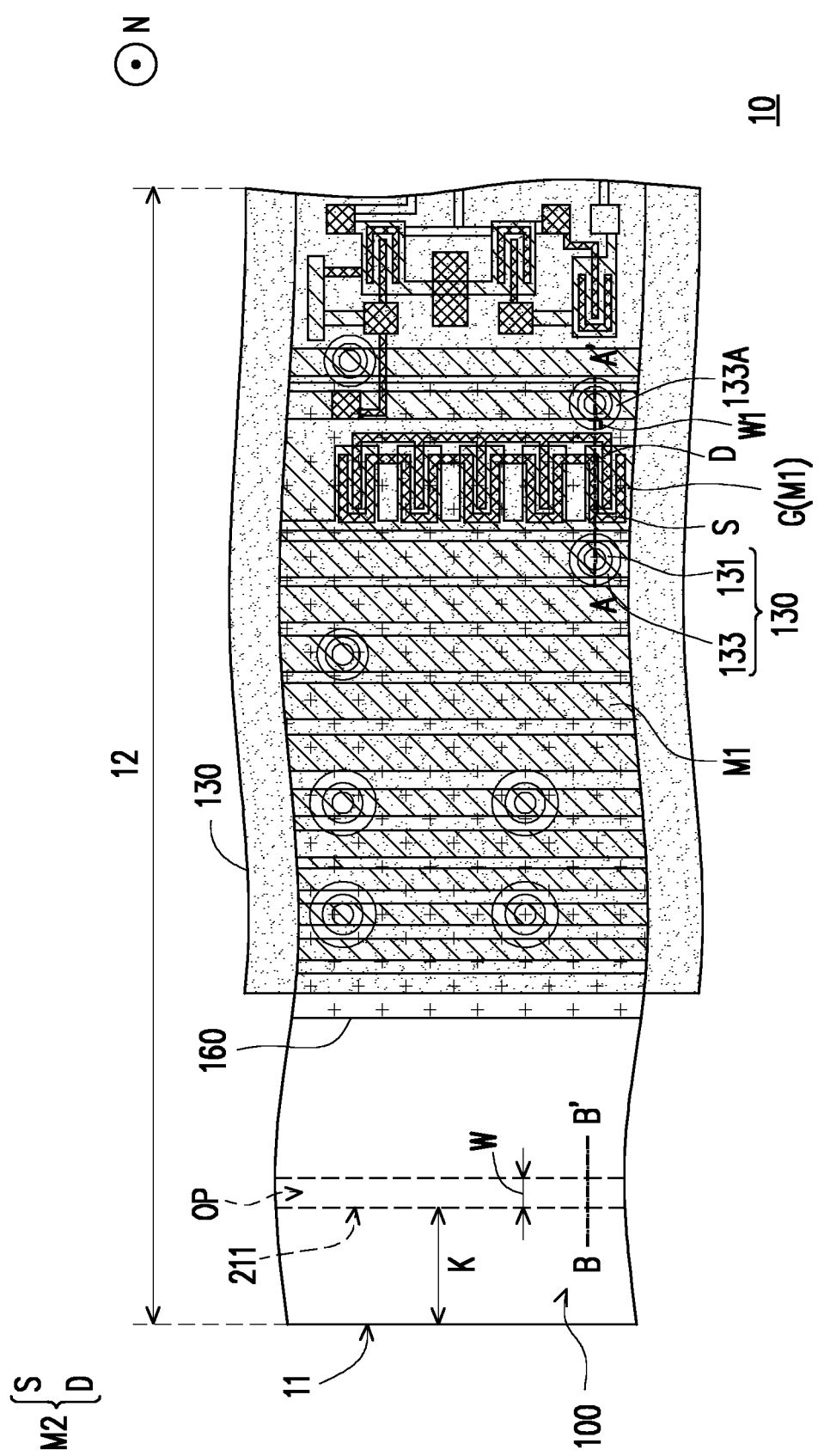
FIG. 1 is a schematic top view of an electronic device according to an embodiment of the disclosure.

The disclosure may be understood with reference to the following detailed description and the accompanying drawings. It should be noted that, for ease of understanding by readers and concise drawings, a plurality of accompanying drawings in the disclosure merely show a part of an electronic device or a display device, and specific elements in the accompanying drawings are not drawn to scale. In addition, the quantity and size of the elements in the drawings are merely exemplary, and are not intended to limit the scope of the disclosure. For example, relative sizes, thicknesses, and positions of films, regions, and/or structures may be reduced or enlarged for clarity.

The term "approximately", "equal to", "the same as", "substantially" or "roughly" referred to herein generally represents falling within 10% of a given value or a range, or represents falling within 5%, 3%, 2%, 1%, or 0.5% of a given value or a range. In addition, phrases "a given range is a first value to a second value" and "a given range falls within a range of a first value to a second value" mean that the given range includes the first value, the second value, and other values between the first value and the second value.

In the disclosure, a situation that one structure (or a layer, a component, a substrate) is located on another structure (a layer, a component, a substrate) may refer to that the two structures are located adjacent to each other and in direct connection, or refer to that the two structures are adjacent to each other but in indirect connection, and the indirect connection refers to that there is at least one intermediate structure (or an intermediate layer, an intermediate component, an intermediate substrate, an intermediate interval) between the two structures, where a lower surface of one structure is adjacent to or directly connected to an upper surface of the intermediate structure, and an upper surface of the other structure is adjacent to or directly connected to a lower surface of the intermediate structure, and the intermediate structure may be composed of a single-layer or multi-layer physical structure or non-physical structure, which is not limited by the disclosure. In the disclosure, when a structure is placed "on" another structure, it may mean that the structure is "directly" on the other structure, or that the structure is "indirectly" on the other structure, i.e., there is at least one structure clamped between the structure and the other structure.

The electrical connections or couplings mentioned in the disclosure may all refer to direct connections or indirect connections, and in the case of the direct connection, terminals of two circuit components are directly connected or connected through a conductive line, and in the case of the indirect connection, a switch, a diode, a capacitor, an inductor, a resistor or other proper components or a combination of the above components may be configured between the terminals of the two circuit components, but the disclosure is not limited thereto.

In the following embodiments, same or similar reference numerals are used to indicate same or similar elements, and details may be omitted in the description. In addition, the features in the embodiments may be used in any combination without departing from the spirit of the invention or conflicting with each other, and simple equivalent changes and modifications made to the specification or the claims shall still fall within the scope of the disclosure. Besides, the terms "first", "second" and the like mentioned in the specification or the claims are used only to name discrete elements or to distinguish different embodiments or ranges, but are not intended to define the upper or lower limit of the number of elements or the manufacturing or arrangement order of the elements.

In the disclosure, a scanning electron microscope (SEM), a thin-film thickness profile measuring instrument (α-step), an elliptical thickness gauge or other suitable methods may be used to measure a thickness of each layer. In detail, in some embodiments, the SEM may be used to obtain a cross-sectional image of a structure, and measure a thickness of each layer in the image. The above thickness may be the maximum thickness in a normal direction in any cross-sectional image, in other words, the thickness may be the maximum thickness in a local area of the electronic device. Moreover, a method of using the SEM to perform thickness measurement includes using the SEM to measure thickness after disassembling and splitting the electronic device to obtain a single substrate. In the present disclosure, the thickness may be measured by using an optical microscope (OM), a SEM, or other suitable methods.

A display device of the disclosure may be applied to various electronic devices. The electronic device may include a display device, an antenna device, a sensing device, or a splicing device, but the disclosure is not limited thereto. The electronic device may be a bendable or flexible electronic device. The electronic device may include, for example, liquid crystal or light-emitting diodes; the light-emitting diodes may include, for example, organic light-emitting diodes (OLEDs), mini LEDs, micro LEDs or quantum dot (QD) LEDs (for example, QLED, QDLED), fluorescence, phosphor, or other suitable materials and the materials may be arbitrarily arranged and combined, but the disclosure is not limited thereto. The antenna device may be, for example, a liquid crystal antenna, but the disclosure is not limited thereto. The splicing device may be, for example, a display splicing device or an antenna splicing device, but the disclosure is not limited thereto. It should be noted that the electronic device may be any arrangement and combination of the above, but the disclosure is not limited thereto. Hereinafter, the display device will be used as the electronic device or the splicing device to explain the content of the disclosure, but the disclosure is not limited thereto.

In the disclosure, the various embodiments described below may be mixed and matched without departing from the spirit and scope of the disclosure. For example, some features of one embodiment may be combined with some features of another embodiment to become another embodiment.

Reference will now be made in detail to the exemplary embodiments of the disclosure, examples of which are illustrated in the drawings. Wherever possible, the same component symbols are used in the drawings and description to denote the same or similar parts.

Figure 2:
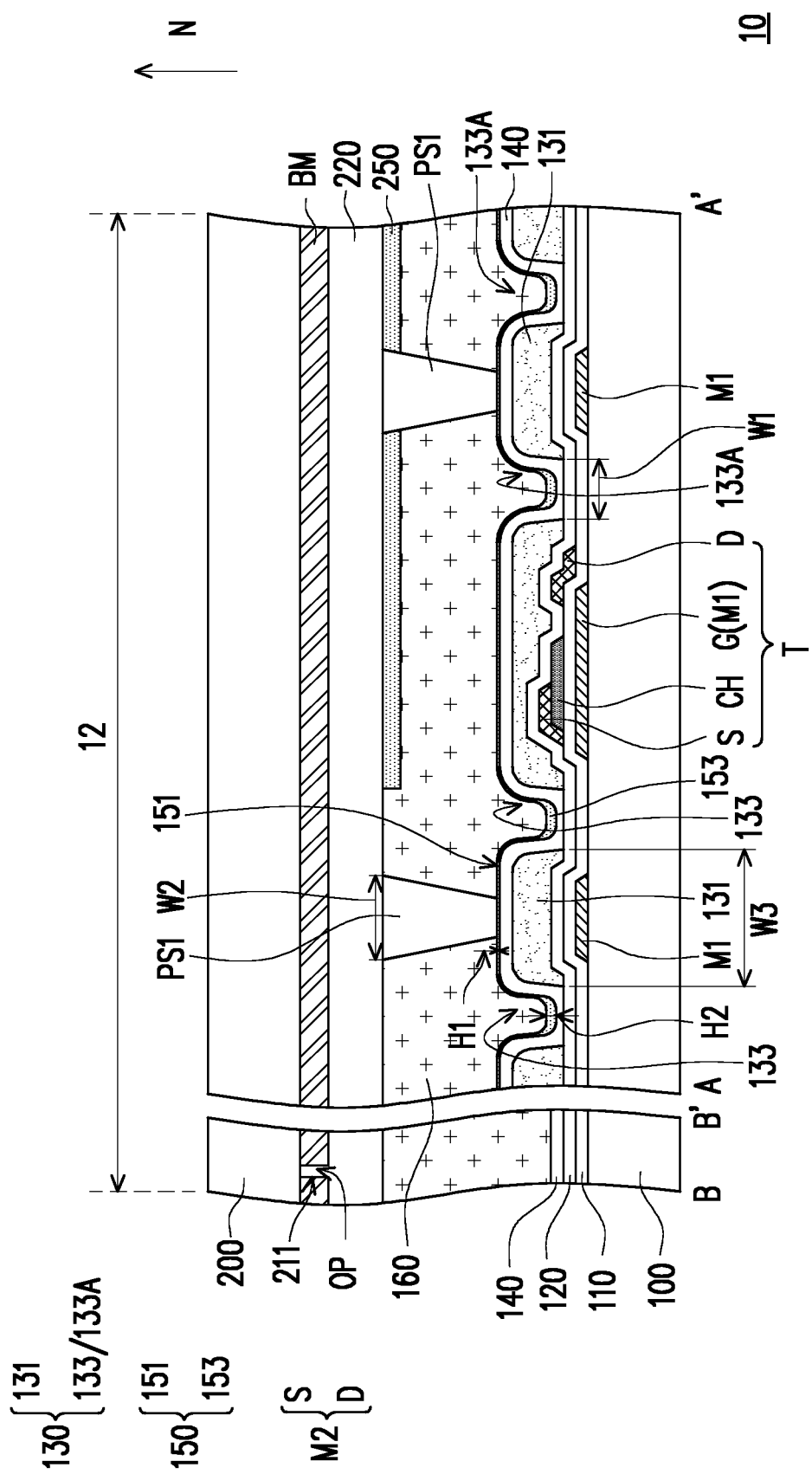
FIG. 2 is a schematic cross-sectional view of the electronic device of FIG. 1 viewing along a section line A-A' and a section line B-B'.

FIG. 1 is a schematic top view of an electronic device according to an embodiment of the disclosure. For the sake of clarity and convenience in the drawing, several components are omitted in FIG. 1. FIG. 2 is a schematic cross-sectional view of the electronic device of FIG. 1 viewing along a section line A-A' and a section line B-B'. For the sake of clarity and convenience in the drawing, several components are omitted in FIG. 2. Referring to FIG. 1 and FIG. 2, the electronic device 10 includes a first substrate 100, a second substrate 200, a support member (including a first support member PS1), a planarization layer 130, and an alignment layer 150. In the embodiment, the second substrate 200 is disposed opposite to the first substrate 100, and the first support PS1 is disposed between the first substrate 100 and the second substrate 200. The planarization layer 130 is disposed on the first substrate 100 and has a first portion 131 and an opening 133. The first portion 131 of the planarization layer 130 is located between the opening 133 in a normal direction N, and the first support member PS1 and the first portion 131 are overlapped in the normal direction N of the first substrate 100. The alignment layer 150 is disposed on the planarization layer 130. In the embodiment, the electronic device 10 may include a plurality of conductive layers (including a first conductive layer M1 and a second conductive layer M2 (indicated in FIG. 4)), an insulating layer 140, a package element 160, a light-shielding layer BM, an overcoat layer 220 (OC) or display medium layer DM (indicated in FIG. 4). The insulating layer 140 is disposed on the planarization layer 130. The package element 160 is disposed on the insulating layer 140 to surround the support members. The light-shielding layer BM is disposed on the second substrate 200, and the overcoat layer 220 is disposed on the light-shielding layer BM, so that the light-shielding layer BM is located between the overcoat layer 220 and the second substrate 200. The first support member PS1 may be disposed on the overcoat layer 220. In addition, the light-shielding layer BM is disposed between the second substrate 200 and the first support member PS1. In the embodiment, the opening 133 of the planarization layer 130 may form an accommodating space, so that an area of the planarization layer 130 contacting the package element 160 is increased. In addition, the alignment layer 150 may be formed in the accommodating space of the opening 133 to increase a contact area of the alignment layer 150 and the planarization layer 130. In this way, adhesion between the package element 160 and the planarization layer 130 and/or the alignment layer 150 and the planarization layer 130 may be enhanced to increase the reliability of the electronic device 10. Moreover, the accommodating space formed by the opening 133 may buffer a lateral stress of the insulating layer 140 pressed and/or pushed by the support member, so that a risk that the insulating layer 140 is crushed by the support member is reduced, and a situation that moisture passes through the cracked insulating layer 140 to influence the planarization layer 130 or the conductive layer is mitigated, so as to improve the reliability and/or performance of the electronic device 10.

In the embodiment, the electronic device 10 includes the first substrate 100, the second substrate 200 disposed opposite to the first substrate 100, and a plurality of the support members disposed between the first substrate 100 and the second substrate 200. The first substrate 100 or the second substrate 200 may be a transparent substrate, such as a transparent plastic substrate or a glass substrate. For example, a material of the first substrate 100 or the second substrate 200 may include glass, quartz, sapphire, ceramic, polycarbonate (PC), polyimide (PI), polyethylene terephthalate (PET), glass fiber, ceramic, other suitable substrate materials, or a combination of the above materials, but the embodiment is not limited thereto. A material of the support member includes a photoresist material or other suitable materials. The material of the support member may also include an inorganic material, an organic material, other suitable materials, or a combination of the above materials, but the embodiment is not limited thereto. The above-mentioned inorganic material is, for example (but not limited to): silicon oxide, silicon nitride, silicon oxynitride, or a stacked layer of at least two of the above materials. The above-mentioned organic material is, for example (but not limited to): a polymer material such as polyimide resin, epoxy resin, or acrylic resin, etc.

As shown in FIG. 1 and FIG. 2, the electronic device 10 of the embodiment includes a peripheral region 12. The peripheral region 12 may be defined as a region disposed at an edge of the electronic device 10 and surrounding a working region (shown in FIG. 3 and FIG. 4), but the embodiment is not limited thereto. In the embodiment, the support members include a plurality of first support members PS1 disposed on the first substrate 100 and/or the second substrate 200, and the first support members PS1 are disposed in the peripheral region 12, but the embodiment is not limited thereto. In some embodiments, the support members may also be disposed in the working region. In the embodiment, the support members may be arranged in the peripheral region 12 in an array or other suitable manner, but the embodiment is not limited thereto.

In the embodiment, the first conductive layer M1 may be disposed on the first substrate 100, and forms a plurality of traces, a plurality of electrodes, or a plurality of pads through a patterning process. For example, as shown in FIG. 1 and FIG. 2, on the first substrate 100, the first conductive layer M1 may at least form scan lines, gate lines (not shown), or gates G in the peripheral region 12, but the embodiment is not limited thereto. In some embodiments, the first conductive layer M1 may be disposed on the first substrate 100 and may be patterned on any position of the first substrate 100 according to an actual requirement. In the embodiment, a material of the first conductive layer M1 includes a metal material, such as aluminum, molybdenum, copper, nickel, titanium, silver, other suitable metals, an alloy of the above metals, or a combination of the above metals, but the embodiment is not limited thereto. In the embodiment, the patterning process of the first conductive layer M1 includes photolithography, chemical vapor deposition (CVD), physical vapor deposition (PVD), and atomic layer deposition (ALD) or screen printing, but the embodiment is not limited thereto.

A gate insulating layer 110 is disposed on the first substrate 100 and partially overlaps the first conductive layer M1. A material of the gate insulating layer 110 includes an inorganic material, an organic material, other suitable materials, or a combination of the above materials, but the embodiment is not limited thereto. The above-mentioned inorganic material is, for example (but not limited to): silicon oxide, silicon nitride, silicon oxynitride, or a stacked layer of at least two of the above materials. The above-mentioned organic material is, for example (but not limited to): a polymer material such as polyimide resin, epoxy resin, and acrylic resin, etc.

In the embodiment, a plurality of active devices T may be disposed on the first substrate 100. The active device T includes a gate G, a semiconductor layer CH, a source S, and a drain D. As shown in FIGS. 1 and 2, the semiconductor layer CH is disposed on the gate insulating layer 110, and the source S and the drain D are electrically connected to the semiconductor layer CH. A dielectric layer 120 is disposed on the gate insulating layer 110 and partially overlaps the semiconductor layer CH, the source S, and the drain D, but the embodiment is not limited thereto. The active device T includes a thin film transistor (TFT), such as a top gate TFT, a bottom gate TFT, or other suitable TFTs, but the embodiment is not limited thereto. In the embodiment, the gate G belongs to the first conductive layer M1, and the source S and the drain D belong to the second conductive layer M2. A material of the second conductive layer M2 may include molybdenum, aluminum, copper, nickel, titanium, silver, other suitable metals, an alloy of the above metals, or a combination of the above metals, but the embodiment is not limited thereto. The semiconductor layer CH may include amorphous silicon, low-temperature polysilicon (LTPS), or metal oxide, but the embodiment is not limited thereto. In some embodiments, different active devices T may include different materials of the semiconductor layer CH, but the embodiment is not limited thereto.

In the embodiment, the second conductive layer M2 may be disposed on the gate insulating layer 110, and may form a plurality of signal traces or a plurality of pads through a patterning process. The signal traces are, for example, data lines (not shown), common electrode lines (not shown), power lines (not shown), ground wires (not shown) or other suitable lines, but the embodiment is not limited thereto. In the embodiment, a plurality of the active devices T may be electrically connected to the first conductive layer M1 and the second conductive layer M2 in the gate insulating layer 110 and the dielectric layer 120 to be used as an active device array or a gate on array (GOA), but the embodiment is not limited thereto.

The dielectric layer 120 is disposed on the gate insulating layer 110 and partially overlaps the second conductive layer M2. A material of the dielectric layer 120 includes an inorganic material, an organic material, other suitable materials, or a combination of the above materials, but the embodiment is not limited thereto. The above-mentioned inorganic material is, for example (but not limited to): silicon oxide, silicon nitride, silicon oxynitride, or a stacked layer of at least two of the above materials. The above-mentioned organic material is, for example (but not limited to): a polymer material such as polyimide resin, epoxy resin, or acrylic resin, etc.

The planarization layer 130 is disposed on the dielectric layer 120. In the embodiment, the planarization layer 130 is disposed on the dielectric layer 120 over the entire surface, and is partially located in the peripheral region 12 and has a distance (not indicated) from an outer edge of the electronic device 10. Namely, the planarization layer 130 is not aligned with an edge of the first substrate 100. According to another aspect, the planarization layer 130 has a distance from the edge of the first substrate 100. The planarization layer 130 is overlapped with the first conductive layer M1, the second conductive layer M2, and/or a plurality of the active devices T in the normal direction N of the first substrate 100. A material of the planarization layer 130 includes an organic material, but the embodiment is not limited thereto. For example, the material of the planarization layer 130 includes perfluoroalkoxy polymer resin (PFA), polymer film on array (PFA), fluoroelastomers, etc., but the embodiment is not limited thereto. In some embodiments, the material of the planarization layer 130 may also include an inorganic material, other suitable materials, or a combination of the aforementioned materials, but the embodiment is not limited thereto.

In the embodiment, a thickness of the planarization layer 130 is, for example, in a range from 0.1 μm to 5 μm (0.1 μm ≤ thickness ≤ 5 μm), or in a range from 1.5 μm to 2.5 μm (1.5 μm ≤ thickness ≤ 2.5 μm), but the disclosure is not limited thereto. In the embodiment, the thickness of the planarization layer 130 may be defined as the maximum thickness of the planarization layer 130 in the normal direction N of the first substrate 100 after splitting. According to the above arrangement, the planarization layer 130 may have a sufficient thickness, so that the opening 133 of the peripheral region 12 may also have a sufficient thickness, and the subsequent alignment layer 150 may flow into the opening 133 during the manufacturing process, in this way, the thickness of the alignment layer 151 on the planarization layer 130 is reduced, and the thickness of the alignment layer 153 in the opening 133 is increased. The increase of the thickness of the alignment layer 153 may increase anchoring energy of alignment thereof. In addition, the thickness reduction of the alignment layer 151 on the first portion 131 may reduce fragments probably generated in the subsequent processes, so as to improve the reliability or performance of the electronic device 10, or improve the display quality of the electronic device 10.

The insulating layer 140 is disposed on the planarization layer 130. In the embodiment, the insulating layer 140 is disposed on the first substrate 100 over the entire surface and partially overlaps the planarization layer 130, and is partially located in the peripheral region 12. A material of the insulating layer 140 includes an inorganic material. The above-mentioned inorganic material is, for example (but not limited to): silicon oxide, silicon nitride, silicon oxynitride, or a stacked layer of at least two of the above materials. In some embodiments, the material of the insulating layer 140 further includes an organic material, other suitable materials or a combination of the above materials, but the embodiment is not limited thereto. The above-mentioned organic material is, for example (but not limited to): a polymer material such as polyimide resin, epoxy resin, or acrylic resin, etc. In the embodiment, the insulating layer 140 is an inorganic material, and the planarization layer 130 is an organic material, but the embodiment is not limited thereto.

In the embodiment, a thickness of the insulating layer 140 is, for example, in a range from 0.1 μm to 0.8 μm (0.1≤thickness≤0.8 μm), or in a range from 0.25 μm to 0.75 μm (0.25 μm≤thickness≤0.75 μm), but the disclosure is not limited thereto. In the embodiment, the thickness of the insulating layer 140 may be defined as the maximum thickness of the insulating layer 140 in the normal direction N of the first substrate 100 after splitting. It should be noted that the thickness of the planarization layer 130 divided by the thickness of the insulating layer 140 is greater than or equal to 1.5 and less than or equal to 25

$$\left(1.5 < \frac{\text{the thickness of the planarization layer}}{\text{the thickness of the insulating layer}} \le 25\right).$$

According to the above configuration, the insulating layer 140 may protect the planarization layer 130 from being influenced by moisture, or the planarization layer 130 may have a sufficient thickness so that the surface of the planarization layer 130 contacting the insulating layer 140 may be planarized to enhance the structural reliability of the electronic device 10.

The alignment layer 150 is disposed on the insulating layer 140 on the planarization layer 130. In the embodiment, the alignment layer 150 is disposed on the first substrate 100, and a part of the alignment layer 150 is located in the peripheral region 12. The alignment layer 150 may be overlapped with a part of the planarization layer 130 or the insulating layer 140 in the normal direction N of the first substrate 100. According to another aspect, the insulating layer 140 is disposed between the planarization layer 130 and the alignment layer 150, but the embodiment is not limited thereto. A material of the alignment layer 150 includes an organic material, such as polyimide, but the disclosure is not limited thereto. In some embodiments, the material of the alignment layer 150 may also include an inorganic material. The above-mentioned inorganic material is, for example (but not limited to): silicon oxide, silicon nitride, silicon oxynitride, or a stacked layer of at least two of the above materials.

In the embodiment, a thickness of the alignment layer 150 is, for example, in a range from 300 Ångström (Å) to 1500 Å (300 Å≤ thickness ≤ 1500 Å), or in a range from 500 Å to 1200 Å (500 Å≤ thickness ≤ 1200 Å), but the disclosure is not limited thereto. In the embodiment, the thickness of the alignment layer 150 may be defined as the maximum thickness of the alignment layer 150 in the normal direction N of the first substrate 100 after splitting.

The light-shielding layer BM is disposed on the second substrate 200. In the embodiment, the light-shielding layer BM may be partially located in the peripheral region 12. The light-shielding layer BM is, for example, a black matrix, but the disclosure is not limited thereto. The light-shielding layer BM may be patterned to form a plurality of patterned openings (not shown) corresponding to a plurality of pixel regions (not shown). For example, the light-shielding layer BM may be correspondingly overlapped with a patterned trace (not shown) of the first conductive layer M1 or a patterned signal trace (not shown) of the second conductive layer M2 in the normal direction N of the first substrate 100, but the disclosure is not limited thereto.

The overcoat layer 220 is disposed on the light-shielding layer BM. In the embodiment, the overcoat layer 220 may be disposed on the light-shielding layer BM, and partially located in the peripheral region 12. The overcoat layer 220 is, for example, a transparent overcoat layer, but the disclosure is not limited thereto.

It should be noted that the light shielding layer BM of the embodiment has a groove OP in the peripheral region 12, and the groove OP may surround the electronic device 10 in the peripheral region 12. The groove OP is not overlapped with the planarization layer 130 in the normal direction of the first substrate 100. In other words, the groove OP of the light-shielding layer BM is located in a region of the light-shielding layer BM that is not overlapped with the planarization layer 130. In the embodiment, there is a distance K between the groove OP and an outer edge 11 of the electronic device 10, and the distance K may be, for example, in a range from 10 μm to 150 μm (10 μm≤distance K≤150 μm), or in a range from 50 μm to 100 μm (50 μm≤distance K≤100 μm). The above-mentioned distance K may be defined as the shortest distance between the outer edge 11 of the electronic device 10 and an outer edge 211 of the groove OP in a local area in a direction perpendicular to the normal direction N of the first substrate 100. A width W of the groove OP may be in a range from 10 μm to 100 μm (10 μm≤width W≤100 μm), or in a range from 15 μm to 25 μm (15 μm≤width W≤25 μm). The width W of the groove OP may be defined as the maximum width of the groove OP in the local area in the direction perpendicular to the normal direction N of the first substrate 100.

According to the above configuration, the overcoat layer 220 may be filled into the groove OP to increase a contact area or adhesion strength between the overcoat layer 220 and the light-shielding layer BM, so as to improve the reliability or performance of the electronic device 10 or improve the display quality of the electronic device 10.

A plurality of supporting members are disposed on one of the first substrate 100 and the second substrate 200. In the embodiment, the support members include a plurality of the first support members PS1 disposed in the peripheral region 12. The first support members PS1 are disposed on the overcoat layer 220 on the second substrate 200 and press against the planarization layer 130 on the first substrate 100. To be specific, the first support members PS1 press against the surface of the insulating layer 140 on the planarization layer 130, but the disclosure is not limited thereto. In some embodiments, the first support members PS1 may not contact the insulating layer 140. In some embodiments, the first support members PS1 may also be in contact with the alignment layer 151. Due to the arrangement of the opening 133, the thickness of the alignment layer 151 on the first portion 131 of the planarization layer 130 may be reduced to reduce the contact of the first support PS1 with the alignment layer 151, so as to reduce fragments of the alignment layer 151 caused by squeezing during the contact, which may improve the reliability or performance of the electronic device 10 or improve the display quality of the electronic device 10.

In the embodiment, the electronic device 10 further includes an another alignment layer 250. The another alignment layer 250 may be disposed on the overcoat layer 220 and surround the first support members PS1. Namely, the another alignment layer 250 may be in direct contact with the first support members PS1, and in the normal direction N1 of the first substrate 100, the another alignment layer 250 is not located between the first support members PS1 and the overcoat layer 220, namely, the another alignment layer 250 is not overlapped with the first support member PS1, but the embodiment is not limited to thereto. In some embodiments, the another alignment layer 250 may directly contact side walls of the first support members PS1. In some embodiments, the another alignment layer 250 may directly contact top surfaces of the first support members PS1. In some other embodiments, the another alignment layer 250 may not contact the first support members PS1. A material of the another alignment layer 250 and the material of the alignment layer 150 may be the same or different, which includes an organic material, such as polyimide, but the disclosure is not limited thereto. In some embodiments, the material of the another alignment layer 250 may also include an inorganic material. The above-mentioned inorganic material is, for example (but not limited to): silicon oxide, silicon nitride, silicon oxynitride, or a stacked layer of at least two of the above materials.

The package element 160 is disposed in the peripheral region 12 and located between the first substrate 100 and the second substrate 200. In the embodiment, the package element 160 is, for example, a sealant, which is circumferentially disposed near the outer edge of the electronic device 10 and overlapped with a part of the peripheral region 12. For example, the package element 160 may be overlapped with a part of the traces of the first conductive layer M1, a part of the signal traces of the second conductive layer M2, and the active devices T in the normal direction N of the first substrate 100. A material of the package element 160 includes epoxy resin, polymethylmethacrylate (PMMA), light curing adhesive, thermal curing adhesive, light thermal curing adhesive, other suitable materials, or a combination of the above materials, but the disclosure is not limited to thereto.

The electronic device 10 of the embodiment applies a technique of configuring the first support members PS1 in the package element 160. According to the above configuration, the package element 160 may directly contact the alignment layer 150 and the another alignment layer 250, and the package element 160 surrounds the first support members PS1 in the peripheral region 12. In addition, the electronic device 10 of the embodiment further includes the planarization layer 130 disposed in the peripheral region 12, and the planarization layer 130 is partially overlapped with the package element 160 in the normal direction N of the first substrate 100. Since the planarization layer 130 may overlap the first conductive layer M1, the second conductive layer M2, and/or the active devices T in the peripheral region 12, thickness consistency of a display medium layer (shown in FIG. 4) may be maintained, so that the overall thickness of the electronic device 10 is consistent or similar, which improves the structural reliability or performance. In addition, the planarization layer 130 may also protect the traces and/or the active devices T in the peripheral region 12 to improve the display quality of the electronic device 10.

It should be noted that the planarization layer 130 has the first portion 131 and the opening 133. As shown in FIG. 1 and FIG. 2, the planarization layer 130 may be patterned to form a plurality of openings 133 and 133A to surround a plurality of the corresponding first portions 131. Namely, the first portion 131 may be disposed between the opening 133 and/or the opening 133A to form, for example, an island shape. According to FIG. 1, it is known that the first portion 131 may be circular in the normal direction N of the first substrate 100 (for example, in a top view direction), and the opening 133 and the opening 133A surround the first portion 131 and have an arc-shaped edge, for example, a circular arc shape in the normal direction N of the first substrate 100, but the embodiment is not limited thereto. In some embodiments, the first portion 131, the opening 133, and/or the opening 133A may also be ellipses, rectangles, triangles, irregular shapes, or other suitable shapes in a top view, but the embodiment is not limited thereto. In the embodiment, a distance W1 of the opening 133 and the opening 133A may be in a range from 5 µm to 50 µm, respectively (5 µm≤distance W1≤50 µm). A width W3 of the first portion 131 is in a range from 15 µm to 50 µm (15 µm ≲ width W3 ≲ 50 µm), or in a range from 25 µm to 30 µm (25 µm ≲ width W3 ≲ 30 µm). The distance W1 of the opening 133 and the opening 133A may be defined as the minimum distance between an opening side wall of the opening 133 and the opening 133A and the first portion 131 in a direction perpendicular to the normal direction N of the first substrate 100. The width W3 of the first portion 131 may be defined as the maximum width of the first portion 131 in the direction perpendicular to the normal direction N of the first substrate 100.

In the embodiment, the opening 133 and the opening 133A are, for example, grooves formed on the planarization layer 130 in the normal direction N of the first substrate 100. The opening 133 may penetrate through the planarization layer 130 in the normal direction N of the first substrate 100, but the embodiment is not limited thereto. The insulating layer 140 may overlap the planarization layer 130 and may be filled into the opening 133 and the opening 133A, and/or overlap the top surface of the first portion 131 in the normal direction N and/or a side wall of the first portion 131 in the opening 133 and the opening 133A. The side wall of the first portion 131 is not parallel to the normal direction N, but has a tilt angle. Or from another point of view, the tilt angle is between the side wall of the first portion 131 and the first substrate 100. When viewing from one side, the formed first portion 131 is substantially trapezoidal in shape, which may increase a surface area of the first portion 131, and the tilt angle facilitates the alignment layer flowing into the opening 133 and the opening 133A in the subsequent process of fabricating the alignment layer, so that the thickness of the alignment layer 151 on the first portion 131 is reduced, and the thickness of the alignment layer 153 in the opening 133 and the opening 133A is increased, but the embodiment is not limited thereto. In this way, the planarization layer 130 may increase the surface in contact with the insulating layer 140 through the opening 133 and the opening 133A, thereby increasing the adhesion or reliability between the planarization layer 130 and the insulating layer 140.

Moreover, the alignment layer 150 formed on the insulating layer 140 may be partially overlapped with the first portion 131, the opening 133, and the planarization layer 130 other than the first portion 131 and the opening 133 in the normal direction N of the first substrate 100. For example, in the process of forming the alignment layer 150, the alignment layer 150 adjacent to the outer edge of the opening 133 may slide into the opening 133 along the surface of the insulating layer 140 and is formed in an accommodating space of the opening 133. In this way, the alignment layer 150 may include the alignment layer 151 overlapped with a part of the first portion 131 (for example, on the first portion 131) in the normal direction N of the first substrate 100 and the alignment layer 153 located in the opening 133. According to the above configuration, the surface area of the alignment layer 150 may be increased. In this way, the area where the package element 160 directly contacts the alignment layer 150 (including the alignment layer 151 on the first portion 131 and the alignment layer 153 in the opening 133) may be increased. Therefore, the adhesion or reliability of the package element 160 and the alignment layer 150 may be increased.

In the embodiment, the alignment layer 151 on the first portion 131 has a first thickness H1, and the alignment layer 153 in the opening 133 has a second thickness H2. The first thickness H1 is greater than or equal to zero, and the first thickness H1 is less than the second thickness H2. For example, the first thickness H1 is greater than or equal to 0 Å and less than or equal to 500 Å, but the disclosure is not limited thereto. The second thickness is greater than 0 Å and less than or equal to 5000 Å. In some embodiments, the second thickness H2 may also be greater than or equal to 500 Å and less than or equal to 1200 Å, but the disclosure is not limited thereto. In the embodiment, the first thickness H1 may be defined as the minimum thickness of the alignment layer 151 substantially located on a central area of the first portion 131 in the normal direction N of the first substrate 100. The above minimum thickness may be defined as the minimum thickness in any cross-sectional image of the structure obtained by the SEM. The second thickness H2 may be defined as the maximum thickness of the alignment layer 152 in the opening 133 in the normal direction N of the first substrate 100.

Moreover, the first support member PS1 is overlapped with the first portion 131 in the normal direction N of the first substrate 100, namely, the first support member PS1 presses against the first portion 131. In the embodiment, a width W2 of the first support member PS1 is smaller than the width W3 of the first portion 131. In the embodiment, the width W2 may be defined as the maximum width of the first support member PS1 in the direction perpendicular to the normal direction N of the first substrate 100. The width W3 may be defined as the maximum width of the first portion 131 in the direction perpendicular to the normal direction N of the first substrate 100. The width W2 of the first support member PS1 is in a range from 5 μm to 40 μm (5 μm≤width W2≤40 μm), or in a range from 9.5 μm to 15 μm (9.5 μm≤width W2≤15 μm), but the embodiment is not limited thereto.

In some embodiment, the alignment layer 150 in the peripheral region 12 is not aligned with an outer edge of the first substrate 100, and the another alignment layer 250 is not aligned with an outer edge of the second substrate 200, so that a part of inorganic material layers may be exposed, for example (but not limited to), the insulating layer 140, the dielectric layer 120, the gate insulating layer 110, the first substrate 100 or the second substrate 200. In this way, the package element 160 may directly contact the inorganic material layers, which may increase the structural reliability or display quality of the electronic device 10.

In the embodiment, as shown in FIG. 2, the first portion 131 located between the opening 133 may be overlapped with the first conductive layer M1 in the normal direction N of the first substrate 100. The first support member PS1 pressing against the first portion 131 may be overlapped with the first conductive layer M1 in the normal direction N of the first substrate 100, but the embodiment is not limited thereto. In some embodiments, the planarization layer 130 that is not overlapped with the first support member PS1 may also be overlapped with the first conductive layer M1, the second conductive layer M2, or the active device T in the normal direction N of the first substrate 100, but the embodiment is not limited thereto. In the embodiment, the insulating layer 140 is disposed between the first support members PS1 and the planarization layer 130. In this way, when the first support member PS1 directly contacts and squeezes the insulating layer 140, the accommodating space formed by the opening 133 of the planarization layer 130 may buffer a lateral stress of the insulating layer 140 pressed and/or pushed by the first support member PS1. To be specific, compared to the planarization layer 130, the harder insulating layer 140 may move laterally through the opening 133 on the softer planarization layer 130 to buffer the influence of stress on the insulating layer 140. Therefore, the risk that the insulating layer 140 is crushed by the first support member PS1 may be reduced. In addition, a phenomenon that moisture passes through the cracked insulating layer 140 and the planarization layer 130 absorbs the moisture to swell may be mitigated, or the influence of moisture on the conductive layer overlapped by the insulating layer 140 may be reduced, so as to improve the reliability and/or performance or display quality of the electronic device 10.

In the embodiment, the package element 160 may also be filled into the opening 133. In this way, the contact area between the package element 160 and the insulating layer 140 or between the package element 160 and the planarization layer 130 may be increased. In this way, the adhesion between the package element 160 and the insulating layer 140 or the planarization layer 130 may be increased to enhance the reliability of the electronic device 10.

In some embodiments, a plurality of the openings 133 may be disposed corresponding to or not corresponding to the support members according to user requirements. In addition, since the sizes of the support members may be set according to user requirements, the sizes of the openings 133 must also be designed corresponding to the sizes of the corresponding support members. In other words, the distances W1 of the openings 133 may be the same or different, and the sizes of the distances W1 of the openings 133 at different positions may be the same or different, which is not limited by the embodiment. For example, the distance W1 of the opening 133 near the outer edge 11 of the electronic device 10 shown in FIG. 2 may be greater than or equal to the distance W1 of the opening 133A away from the outer edge 11, but the embodiment is not limited thereto. For example, the distance W1 of the opening 133 near the outer edge 11 may be 10 μm, and the distance W1 of the opening 133A away from the outer edge 11 may be 6 μm, but the embodiment is not limited thereto. In this way, the widths of the openings may be adjusted according to a design requirement of the support members or requirement on different positions of the support members, so as to increase the adhesion between the support members and the insulating layer 140. It should be noted that, for clarity and convenience's sake, FIG. 2 schematically illustrates the distances W1 of different openings 133 and opening 133A and the distances W1 of different support members to be consistent, but those skilled in the art should understand that as long as the distances W1 of the openings 133 may overlap the conductive layer and make the alignment layer 150 to be filled into the opening 133 and the opening 133A, the distances W1 may be mixed and used in collaboration without departing from the spirit and scope of the disclosure.

In the embodiment, a part of the package element 160 may be overlapped with the insulating layer 140 and/or the dielectric layer 120 in the normal direction N of the first substrate 100, but is not overlapped with the planarization layer 130. Namely, an outer edge of the package element 160 may be located between the outer edge of the first substrate 100 and the outer edge of the planarization layer 130 in the normal direction N of the first substrate 100, but the embodiment is not limited thereto. In some embodiments, the outer edge of the package element 160 may also be aligned with the outer edge of the planarization layer 130. In some embodiments, the outer edge of the package element 160 may also be aligned with the outer edge of the first substrate 100. In addition, the groove OP of the light-shielding layer BM may not be overlapped with the package element 160 in the normal direction N, but the embodiment is not limited thereto.

In brief, in the electronic device 10 of an embodiment of the disclosure, since the planarization layer 130 may be disposed in the peripheral region 12, and the planarization layer 130 has a plurality of the openings 133 and the first portions 131 between the openings 133, the contact area of the planarization layer 130 may be increased, and the alignment layer 150 on the planarization layer 130 may flow into a plurality of the openings 133 during the manufacturing process, so as to reduce the thickness of the alignment layer 151 on the planarization layer 130, and increase the adhesion between the package element 160 and the planarization layer 130 to improve the structural reliability of the electronic device 10. Moreover, the alignment layer 150 may flow into the opening 133 to reduce the thickness of the alignment layer 151 on the planarization layer 130, and reduce fragments that may be generated by the alignment layer 151. In this way, the reliability or performance of the electronic device 10 may be improved. In addition, the first thickness H1 of the alignment layer 151 located on the first portion 131 is smaller than the second thickness H2 of the alignment layer 153 in the opening 133, by which the adhesion between the alignment layer 150 and the insulating layer 140 is increased, or the first support member PS1 may contact the insulating layer 140 to increase the adhesion between the first support member PS1 and the insulating layer 140. Moreover, the adhesion between the package element 160 and the alignment layer 150 may also be enhanced. In addition, the opening 133 may also buffer the lateral stress of the insulating layer 140 pressed and/or pushed by the first support member PS1, so that the risk that the insulating layer 140 is squeezed and crushed by the first support member PS1 may be reduced, and the phenomenon that moisture passes through the cracked insulating layer 140 and the planarization layer 130 absorbs the moisture to swell may be mitigated, so as to improve the reliability, performance and display quality of the electronic device 10. Moreover, the planarization layer 130 is overlapped with the first conductive layer M1, the second conductive layer M2, or the active devices T in the normal direction N of the first substrate 100, and protects the above components to reduce a direct impact of external environment on performance of the electronic components, so as to improve the performance or display quality of the electronic device 10.

Figure 3:
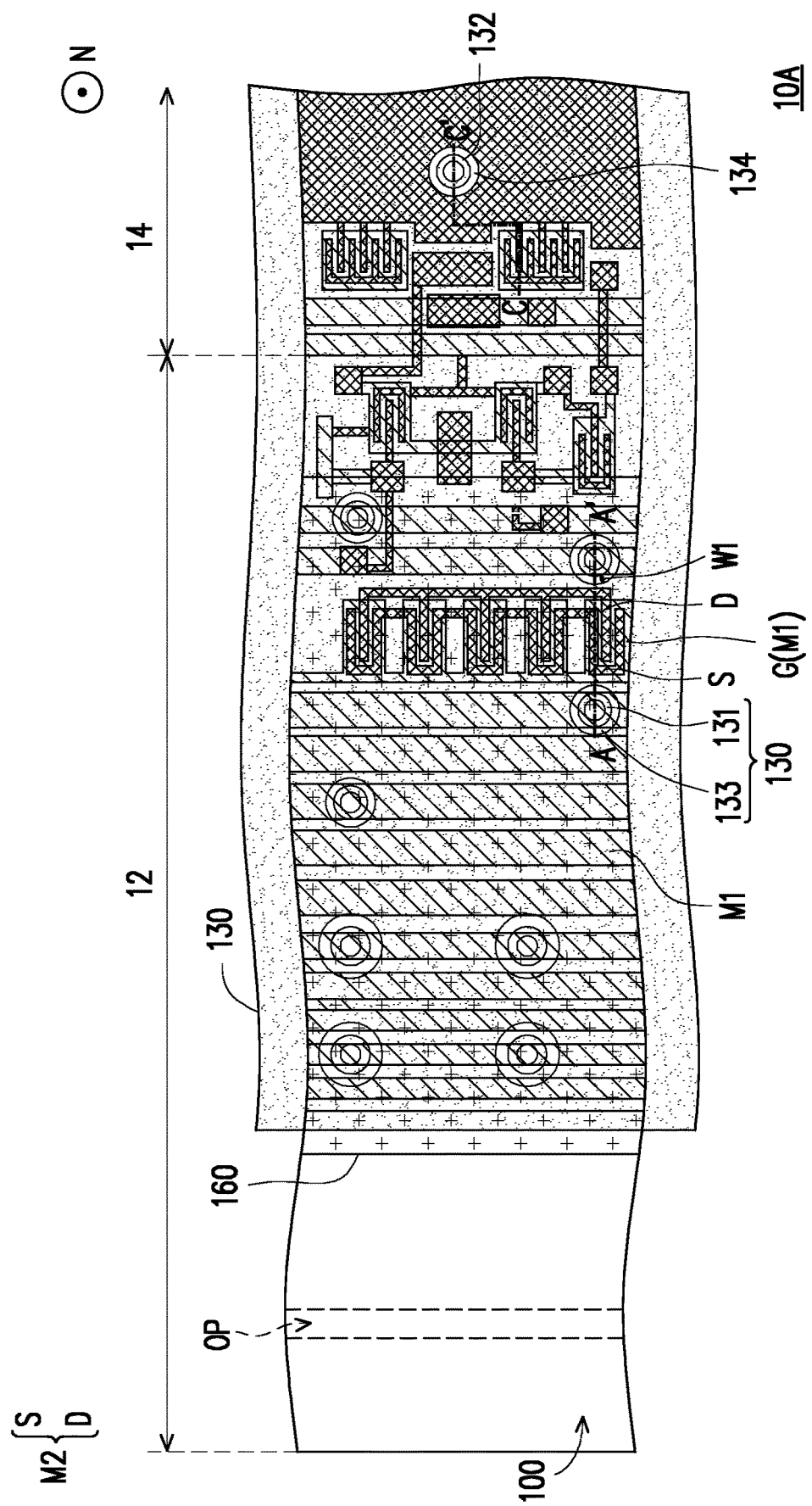
FIG. 3 is a schematic top view of an electronic device according to another embodiment of the disclosure.
Figure 4:
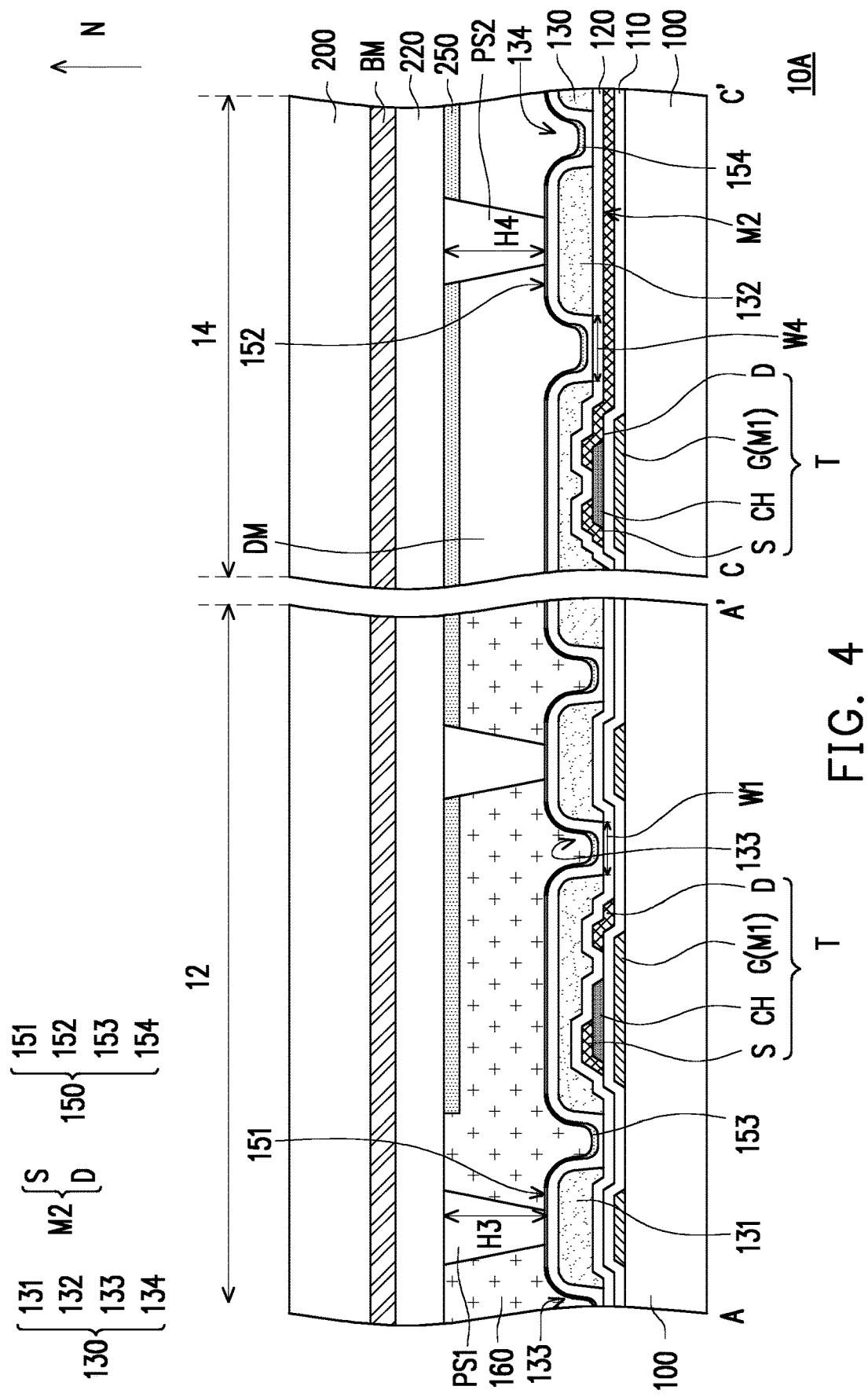
FIG. 4 is a schematic cross-sectional view of the electronic device of FIG. 3 viewing along a section line A-A' and a section line C-C'.

FIG. 3 is a schematic top view of an electronic device according to another embodiment of the disclosure. For clarity and convenience's sake, FIG. 3 omits illustration of some components. FIG. 4 is a schematic cross-sectional view of the electronic device of FIG. 3 viewing along a section line A-A' and a section line C-C'. For clarity and convenience's sake, FIG. 4 omits illustration of some components. The electronic device 10A of the embodiment is substantially similar to the electronic device 10 of FIG. 1, so that the same and similar components in the two embodiments will not be repeated. A main difference between the electronic device 10A of the embodiment and the electronic device 10 is that the electronic device 10A further has a working region 14.

In detail, the working region 14 may be defined as a region of the electronic device 10A having a signal adjusting function, such as an optical signal or an electromagnetic wave signal, but the embodiment is not limited thereto. In the embodiment, the working region 14 may be disposed adjacent to the peripheral region 12 and surrounded by the peripheral region 12, but the embodiment is not limited thereto. The working region 14 may include a plurality of working electrodes (not shown) (which may be, for example, pixel electrodes and common electrodes) and an active device array (not shown). Referring to FIG. 3 and FIG. 4, in the working region 14, the active device T is disposed on the first substrate 100, and the planarization layer 130 is disposed on the dielectric layer 120, and is partially overlapped with the first conductive layer M1, the second conductive layer M2, and the active device T in the normal direction N of the first substrate 100. In the embodiment, a display medium layer DM may be disposed between the first substrate 100 and the second substrate 200. A material of the display medium layer DM includes a liquid crystal material, an electrowetting display material, an electrophoretic display material, etc., but the embodiment is not limited thereto. The active device T is electrically connected to the pixel electrode and is used to provide a driving electric field to drive the display medium layer DM to achieve a desired signal adjusting effect.

In the embodiment, the planarization layer 130 of the electronic device 10A further has a plurality of openings 134 disposed in the working region 14. The openings 134 in the working region 14 are substantially similar to the openings 133 in the peripheral region 12, so that detail thereof is not repeated. A width W4 of the opening 134 in the working region 14 and the distance W1 of the opening 133 in the peripheral region 12 may be the same or different, which is not limited by the embodiment. For example, the distance W1 of the opening 133 in the peripheral region 12 may be greater than or equal to the width W4 of the opening 134 in the working region 14, or the width W4 of the opening 134 in the working region 14 may be greater than or equal to the distance W1 of the opening 133 in the peripheral region 12, but the embodiment is not limited thereto.

In the embodiment, the alignment layer 150 further includes an alignment layer 152 disposed on the first portion 132 and an alignment layer 154 disposed in the opening 134. As shown in FIG. 4, a part of the alignment layer 150 on the first portion 132 may slide into the opening 134 to become the alignment layer 154 formed in the accommodating space of the opening 134.

As shown in FIG. 3 and FIG. 4, the electronic device 10A further includes a second support member PS2 disposed in the working region 14, and the second support member PS2 is disposed between the first substrate 100 and the second substrate 200. For example, the second support PS2 may be disposed on the first portion 132 between the opening 134 in the working region 14. The second support member PS2 is substantially similar to the first support member PS1, so that detail thereof is not repeated. The second support member PS2 is overlapped with the first portion 132 in the normal direction N of the first substrate 100, namely, the second support member PS2 presses against the first portion 132. In addition, with respect to the first support member PS1, the second support member PS2 may be overlapped with the second conductive layer M2 in the normal direction N of the first substrate 100. In some embodiments, the second support member PS2 may be overlapped with the first conductive layer M1 and the second conductive layer M2 in the normal direction N of the first substrate 100, but the embodiment is not limited thereto. In some embodiments, the second support member PS2 presses against the surface of the insulating layer 140 on the planarization layer 130, but the embodiment is not limited thereto. In some other embodiments, the second support member PS2 may also be in contact with the alignment layer 152. Due to the configuration of the opening 134, the thickness of the alignment layer 152 on the first portion 132 of the planarization layer 130 may be reduced to reduce the contact between the second support member PS2 and the alignment layer 152, so as to reduce fragments of the alignment layer 152 probably caused by squeezing during the contact. In this way, the reliability or performance of the electronic device 10 is enhanced, or the display quality of the electronic device 10 is enhanced.

In the embodiment, a width of the second support member PS2 is smaller than a width of the first portion 132. The width of the second support member PS2 is in a range from 15 µm to 50 µm (15 µm≤ width≤ 50 µm), or in a range from 20 µm to 30 µm (20 µm≤ width≤ 30 µm). The width of the second support member PS2 may be defined as the maximum width of the second support member PS2 in the direction perpendicular to the normal direction N of the first substrate 100. Moreover, the width of the first support member PS1 and the width of the second support member PS2 may be the same or different. In some embodiments, the width of the first support member PS1 may be greater than or equal to the width of the second support member PS2. In some other embodiments, the width of the second support member PS2 may be greater than or equal to the width of the first support member PS1, but the disclosure is not limited thereto.

It should be noted that a height H3 of the first support member PS1 in the embodiment is the same as a height H4 of the second support member PS2. For example, the height H3 of the first support member PS1 is in a range from 1 µm to 6 µm (1 µm≤ height H3≤ 6 µm), or in a range from 2 µm to 4 µm (2 µm≤ height H3≤ 4 µm). The height H4 of the second support member PS2 is in a range from 1 µm to 6 µm (1 µm≤ height H4≤ 6 µm), or in a range from 2 µm to 4 µm (2 µm≤ height H4≤ 4 µm). The height H3 of the first support member PS1 may be defined as the maximum height of the first support member PS1 on the first portion 131 in the normal direction N of the first substrate 100. The height H4 of the second support member PS2 may be defined as the maximum height of the second support member PS2 on the first portion 132 in the normal direction N of the first substrate 100. According to the above configuration, the thickness maintained by the second support member PS2 in the working region 14 may be substantially the same or similar to the thickness maintained by the first support member PS1 in the peripheral region 12. In this way, the overall thickness of the electronic device 10A may be substantially uniform or similar, so as to improve structural reliability or performance, or enhance the display quality of the electronic device 10A.

In summary, in the electronic device of an embodiment of the disclosure, since the planarization layer may be disposed in the peripheral region and/or the working region, and the planarization layer has a plurality of openings and the first portions between the openings, the contact area of the planarization layer may be increased, and the alignment layer on the planarization layer may flow into a plurality of the openings during the manufacturing process, so as to reduce the thickness of the alignment layer on the planarization layer, and reduce the fragments probably generated by the alignment layer, or make the first support member and/or the second support member to contact the insulating layer to respectively increase the adhesion between the first support member and/or the second support member and the insulating layer, so as to improve the adhesion between the package element and the planarization layer, which may improve the reliability or performance of the electronic device, or improve the overall structural reliability of the electronic device. Moreover, the opening may also buffer the lateral stress of the insulating layer that is pressed and/or pushed by the support member (including the first support member or the second support member), so that the risk that the insulating layer is squeezed and crushed by the support member may be reduced, and the phenomenon that moisture passes through the cracked insulating layer and the planarization layer absorbs the moisture to swell may be mitigated, so as to improve the reliability, performance and display quality of the electronic device. The planarization layer is overlapped with the first conductive layer, the second conductive layer, or the active device in the normal direction of the first substrate, and protects the electronic components in the electronic device to reduce a direct impact of external environment on performance of the electronic components, so as to improve the performance or display quality of the electronic device.

Moreover, the ratio of the thickness of the planarization layer to the thickness of the insulating layer may enhance the effect that the insulating layer protects the planarization layer from being influenced by moisture. The sufficient thickness of the planarization layer may increase flatness of the surface of the planarization layer in contact with the insulating layer to improve the structural reliability of the electronic device. The light-shielding layer may be provided with a groove on a region that is not overlapped with the planarization layer. The overcoat layer may be filled into the groove to increase an adhesive strength, which may improve the reliability, performance, or display quality of the electronic device.

It should be noted that the above embodiments are only used to illustrate the technical solution of the disclosure, rather than limit it; although the disclosure has been described in detail with reference to the foregoing embodiments, those of ordinary skill in the art should understand that: the technical solutions described in the aforementioned embodiments may still be modified, or some or all of the technical features may be equivalently replaced; and these modifications or replacements do not deviate the essence of the corresponding technical solutions from the scope of the technical solutions of the embodiments of the disclosure. It should be understood that anyone with ordinary knowledge in the technical field may make changes, substitutions, and decorations without departing from the spirit and scope of the disclosure, and the protection scope of the disclosure also includes a combination of each patent application scope and embodiments.

What is claimed is:

1. An electronic device, including a peripheral region, the electronic device comprising:
    a first substrate;
    a second substrate, disposed opposite to the first substrate;
    an active device disposed on the first substrate and comprising a gate;
    a conductive layer disposed on the first substrate;
    a support member, disposed in the peripheral region and between the first substrate and the second substrate, wherein the support member overlaps the conductive layer and the conductive layer is a same layer of the gate of the active device;
    an overcoat layer disposed between the second substrate and the support member;
    an alignment layer disposed between the first substrate and the overcoat layer and surrounding the support member; and
    a light-shielding layer disposed between the second substrate and the overcoat layer,
    wherein the light-shielding layer has a groove in the peripheral region and the overcoat layer fills into the groove, and
    wherein the alignment layer and the support member are in contact with the overcoat layer.

2. The electronic device as claimed in claim 1, wherein the groove is not overlapped with the support member.

3. The electronic device as claimed in claim 1, further comprising an insulating layer disposed between the first substrate and the support member.

4. The electronic device as claimed in claim 3, further comprising another alignment layer between the insulating layer and the support member.

5. The electronic device as claimed in claim 3, wherein the active device is disposed in the peripheral region.

6. The electronic device as claimed in claim 5, wherein the active device is used as a gate on array.

7. The electronic device as claimed in claim 1, further comprising a package element disposed between the second substrate and the first substrate, wherein the groove is not overlapped with the package element.

8. An electronic device, including a peripheral region, the electronic device comprising:
    a first substrate;
    a second substrate, disposed opposite to the first substrate;
    a support member, disposed in the peripheral region and between the first substrate and the second substrate;
    an overcoat layer disposed between the second substrate and the support member;
    an alignment layer disposed between the first substrate and the overcoat layer and surrounding the support member;
    a light-shielding layer disposed between the second substrate and the overcoat layer; and
    a planarization layer disposed on the first substrate and having two adjacent openings and a first portion disposed between the two adjacent openings, wherein the support member and the first portion are overlapped,
    wherein the light-shielding layer has a groove in the peripheral region and the overcoat layer fills into the groove, and
    wherein the alignment layer and the support member are in contact with the overcoat layer.

* * * * *